C. C. KORNS.
CONDUIT SUPPORT.
APPLICATION FILED FEB. 7, 1919.
1,319,652.
Patented Oct. 21, 1919.
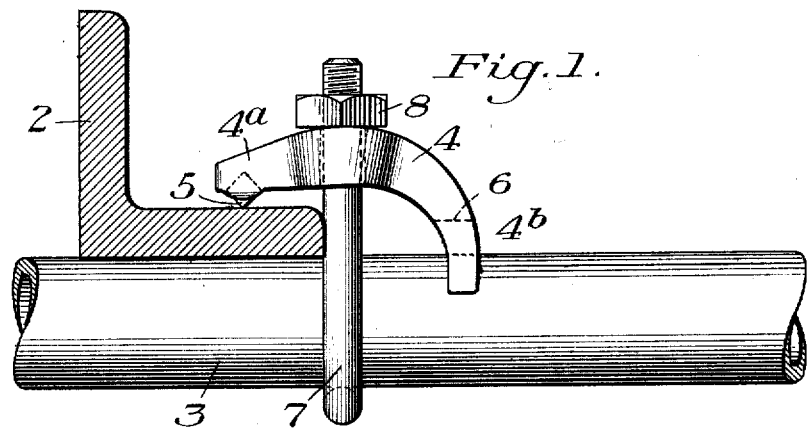
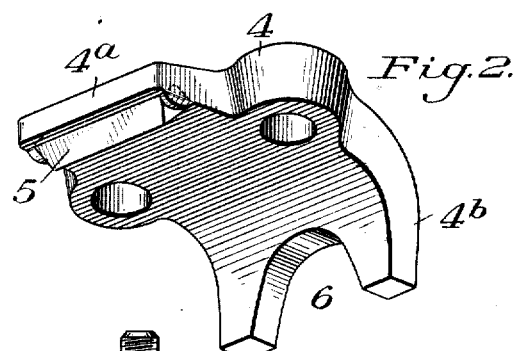
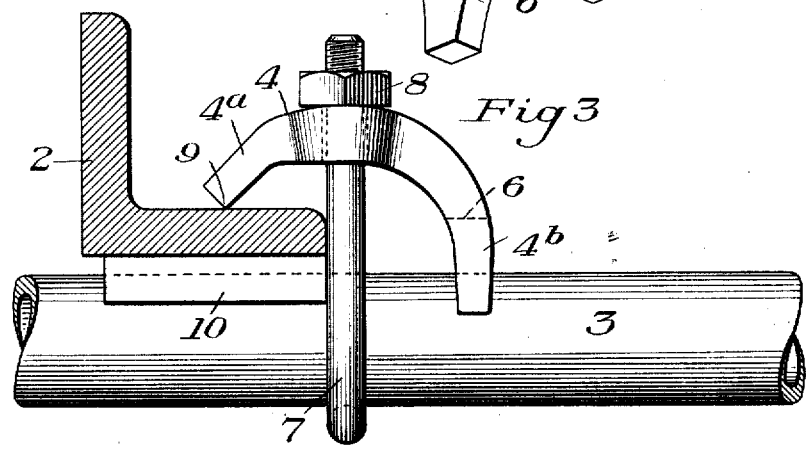
WITNESSES
R. A. Balderson
G. B. Fleming
INVENTOR
C. C. Korns,

UNITED STATES PATENT OFFICE.

CLARENCE C. KORNS, OF JOHNSTOWN, PENNSYLVANIA.

CONDUIT-SUPPORT.

1,319,652.　　　Specification of Letters Patent.　　Patented Oct. 21, 1919.

Application filed February 7, 1919. Serial No. 275,517.

*To all whom it may concern:*

Be it known that I, CLARENCE C. KORNS, a citizen of the United States, residing at Johnstown, in the county of Cambria and State of Pennsylvania, have invented a new and useful Improvement in Conduit-Supports, of which the following is a full, clear, and exact description, reference being had to the accompanying drawing, forming part of this specification, in which—

Figure 1 is a side view showing a conduit support embodying my invention.

Fig. 2 is a perspective view of the jaw member of the support, and

Fig. 3 is a view similar to Fig. 1, but showing a modification.

My invention has relation to conduit supports, or pipe hangers; and is designed to provide a simple and efficient form of device by means of which a conduit pipe may be supported and carried upon the structural work of buildings. My improved support provides a device of this character which can be manufactured at a relatively low cost; which can be quickly and readily applied and removed; and which forms a convenient and secure means for supporting a conduit pipe in a position generally at right angles to the direction of the frame member upon which it is carried.

The nature of my invention will be best understood by reference to the accompanying drawing, which will now be described, it being premised, however, that various changes can be made in the details of construction and arrangement of the several parts, without departing from the spirit and scope of my invention, as defined in the appended claims.

In this drawing, the numeral 2 designates the frame member of a building and which, in this case, consists of an angle. 3 designates a portion of a conduit pipe to be supported. 4 designates a jaw member having a support-engaging portion $4^a$ and a conduit engaging portion $4^b$, these two portions being at an angle to each other. The support-engaging portion $4^a$ is shown in Fig. 1 as being provided with a biting lip or projection 5 which engages the upper surface of the horizontal flange of the angle tube. The pipe-engaging portion $4^b$ is slotted or bifurcated as indicated at 6 so as to engage and partially embrace the conduit pipe. 7 designates a U-bolt which embraces the conduit pipe and whose legs extend upwardly through the intermediate portion of the jaw member where they are secured by the nuts 8.

When the parts are engaged in the manner shown in Fig. 1, it will be seen that the conduit pipe 3 is securely supported and held, the U-bolt pulling it tightly against the underside of the angle flange, and also into the slot or bifurcations of the jaw member.

In the modification shown in Fig. 3, a construction substantially the same as that just described except that instead of providing the support-engaging portion $4^a$ of the jaw member with a biting lip or projection, said portion extends at such an angle to the angle flange that its corner portion 9 is adapted to bite said flange. In this figure I have also shown a spacer 10 interposed between the conduit pipe and the underside of the angle flange. In some cases it may be desirable to use this spacer for the purpose of offsetting the pipe somewhat away from the angle. This spacer may be of any suitable character.

Where the portion $4^a$ is provided with the biting lip or projection, such lip or projection may, if desired, be formed of a separate piece of hard steel, such as tool steel, seated and secured in the said portion $4^a$.

While I have illustrated my invention as applied to a horizontally extending angle, it will be readily understood that the angle may extend either vertically or obliquely. Also that instead of an angle, the support may consist of any flanged member such as a channel, I-beam, etc.

While the invention is designed to form a support for carrying a conduit pipe in a direction generally at right angles to the longitudinal direction of the supporting frame member, it will be readily understood that the parts may be skewed to a considerable angle, if desired.

The advantages of my invention will be apparent from the foregoing. The parts are few in number; can be manufactured at a relatively low cost; and can be quickly applied and removed. At the same time the device is one of great efficiency for the described purposes.

I claim:

1. A conduit support, comprising a jaw member having two portions at an angle to each other, one of said portions forming a support-engaging bite, and the other of said portions being slotted or bifurcated to engage the conduit, together with a U-bolt through which the conduit is designed to extend and whose legs are secured in the intermediate portion of said jaw member, substantially as described.

2. A conduit support, comprising a jaw member having two portions at an angle to each other, one of said portions being shaped to engage the conduit and the other of said portions being shaped to engage a supporting flange, and a U-bolt having its legs secured in the intermediate portion of said jaw member, with its loop extending in the direction of the conduit engaging portion of the jaw member and adapted to support the conduit at a point between said portion and the supporting flange, substantially as described.

In testimony whereof, I have hereunto set my hand.

CLARENCE C. KORNS.

Copies of this patent may be obtained for five cents each, by addressing the "Commissioner of Patents, Washington, D. C."